Patented Dec. 2, 1947

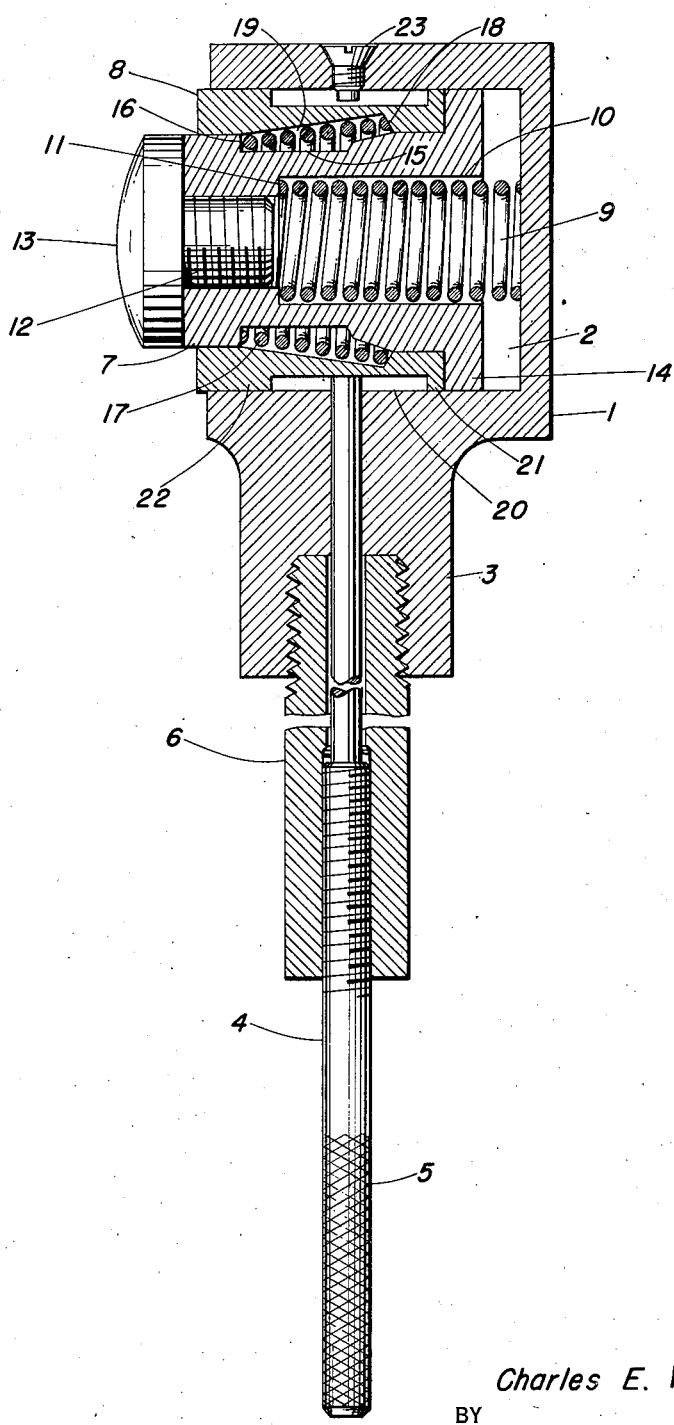

2,431,717

UNITED STATES PATENT OFFICE 2,431,717

TELESCOPING INSIDE GAGE

Charles E. Watson, Bremerton, Wash.

Application October 11, 1945, Serial No. 621,660

4 Claims. (Cl. 33—143)

(Granted under the act of March 3, 1883, as amended April 30, 1928; 370 O. G. 757)

This invention relates to gages and more particularly to chock gages.

An object of the invention is to provide an improved gage having resiliently-mounted movable means adapted to be held against outward movement beyond a predetermined point while being capable of undergoing a greater inward movement whereby the gage is particularly advantageous in obtaining chock measurements.

Other objects of the invention are to provide an improved gage having a resiliently-mounted retractable element and cooperative means for limiting outward movement of the element so as to permit the obtaining of a positive measurement of a clearance; to provide a gage, of the character described, wherein the resiliently-mounted element is adapted to be adjustably fixed in predetermined positions whereby only retraction of said element is permitted; to provide an improved gage having a pair of resiliently-mounted telescoping elements movable relative to each other to a limited extent, with one element being adapted to be held against movement so as to limit outward movement of the other element; and to provide improved elements and arrangements thereof in a gage of the character described and for the purposes set forth.

In accomplishing these and other objects of the present invention, I have provided improved details of structure, the preferred form of which is illustrated in the accompany drawing, wherein:

The single figure is a longitudinal, sectional view of a gage embodying the features of the present invention.

Referring more in detail to the drawing:

The numeral 1 designates a short housing or body which is preferably cylindrical and has an axial bore or socket 2. A tubular nipple or boss 3 projects laterally or radially from the body and is adapted to receive an elongate, cylindrical handle or rod 4. The outer end portion of the rod 4 is of enlarged diameter and is knurled as shown at 5, while its inner end projects into the socket 2. For holding the rod in a fixed position within the boss 3, a cylindrical sleeve or tube 6 is screw-threaded upon the enlarged portion of said rod and is threadedly engaged within the outer end of said boss. The length of the rod 4 and tube 6 are subject to variation.

A pair of telescoping elements 7 and 8 are slidably mounted in the socket 2 and are constantly urged outwardly by a coiled or helical spring 9 which is confined within said socket. The inner element or sleeve 7 is tubular and has an axial bore 10 for receiving the spring 9, the outer portion of the bore being reduced in diameter to provide an annular seat or shoulder 11 against which the spring 9 seats. A knob or button 12, having an enlarged, convexly-curved head 13, is screw-threaded in the reduced outer end of the sleeve bore so as to be movable with said sleeve. The length of the button 12 is subject to variation so as to project a greater or shorter distance beyond the body. An external, radial shoulder or flange 14 is formed on the inner end of the sleeve and slidably engages the bore of the socket 2. The intermediate portion of the sleeve adjacent its outer end is recessed externally as shown by the numeral 15 to provide an external, annular seat or shoulder 16. A coiled or helical spring 17 surrounds the sleeve within its recess 15 and bears against the shoulder 16.

The outer element or bushing 8 circumscribes the sleeve 7 outwardly of its flange 14 and has an external diameter substantially equal to the diameter of said flange so as to have a snug sliding fit within the socket 2. An internal, annular seat or shoulder 18 is formed adjacent the inner end of the bushing by internally recessing the bore of said bushing at its intermediate portion as shown by the numeral 19. The latter recess in conjunction with the external recess 15 of the sleeve forms an annular cavity or chamber between said sleeve and bushing for confining the spring 17 which has its ends bearing against and forcing apart the sleeve and bushing shoulders 16 and 18, respectively. In this manner, the inner end of the bushing 8 and the flange 14 of the sleeve 7 are resiliently maintained in engagement. It is preferable for the bushing to be of less length than the sleeve so as to terminate inwardly of the outer end thereof, while said sleeve is of length substantially equal to the depth of the socket so as to be capable of being housed therein.

For receiving the inner end of the rod 4 which extends through the boss 3 into the socket, the bushing 8 has its intermediate portion externally annularly recessed as shown by the numeral 20. Inward movement of the rod into engagement with the bottom of the recess 20 binds the bushing against movement relative to the body and its socket. Due to the provision of this recess, external, radial shoulders or flanges 21 and 22 are formed at each end of the bushing. A set-screw 23 extends radially through the wall of the body so as to project into the bushing recess 20 and coacts with the flanges 21 and 22 of said bushing to limit movement of the same when the rod is withdrawn from said recess.

Operation

The operation of a gage constructed as described is as follows:

The gage is adapted to measure clearances difficult to obtain, such as for chocks, and is readily withdrawable after the obtaining of the measurement due to the resilient or spring mounting of the telescoping elements 7 and 8. When not in use, the spring 9 bearing against the internal shoulder 11 of the inner element or sleeve 7 urges the latter outwardly of the socket 2. The outer element or bushing 8 moves outwardly with the sleeve due to the engagement of the inner end of said bushing with the external flange 14 of said sleeve and the tension of the spring 17 exerted against and forcing apart the sleeve shoulder 16 and bushing shoulder 18. Outward displacement of the telescoping elements is limited by the inner end flange 21 of the bushing engaging the set-screw 23.

Prior to use, a button 12 of the proper length is screw-threaded into the outer end of the sleeve bore 10. The tube 6 is screw-threaded upon a rod 4 of the desired length and said tube is screw-threaded into the outer end of the boss 3, whereby the inner end of the rod projects into the external recess 20 of the bushing 8. The body 1 is then inserted by means of the rod into the space or clearance desired to be measured. Due to the resilient mounting of the telescoping elements, the same are depressed or retracted by and permit such insertion. However, the elements project sufficiently beyond the body to maintain the head 13 of the button 12 in engagement with one surface while the bottom of said body bears against the other surface forming the space or clearance to be measured.

With the gage in this position, the rod 4 is rotated so as to move the same inwardly of the tube 6, boss 3 and socket 2 and thereby cause the inner end of said rod to frictionally engage the bottom of the bushing recess 20. This engagement binds the bushing against movement so as to limit outward relative movement of the sleeve while permitting retraction or inward relative movement of said sleeve. Upon removal of the gage from the space or clearance being measured, the resiliency of the springs 9 and 17 permits depressing or retraction of the sleeve so as to prevent binding of said gage and permits ready removal of the gage from the space. These springs then project the sleeve back to the outer position as set by the handle 4 to reproduce the exact measurement of the space to which the gage was applied. Thereupon, a micrometer or other measuring device may be applied to the outer surface 13 of the button and opposite end of the gage body to determine the measurement as indicated by the gage.

While I have shown but one embodiment of my invention, it is apparent that the device is susceptible to modification without departing from the spirit of the invention. I do not wish, therefore, to be limited by the disclosure set forth, but only by the scope of the appended claims.

The invention described herein may be manufactured and used by or for the Government of the United States of America for governmental purposes without the payment of any royalties thereon or therefor.

I claim:

1. A gage including, a cylindrical body having an axial socket, a tubular sleeve slidably mounted in the socket, the sleeve having an external flange at its inner end and having an external peripheral recess formed intermediate its ends, a button screw-threaded within the outer end of said sleeve, a helical spring confined within the sleeve and bearing against the bottom of said socket for urging said sleeve outwardly, a cylindrical bushing concentrically surrounding the sleeve outwardly of its flange and slidable within the socket, the bushing having internal and external annular recesses formed intermediate its ends, a helical spring confined within the external recess of said sleeve and the internal recess of said bushing for maintaining the inner end of the bushing and the sleeve flange in engagement whereby said bushing is movable outwardly with said sleeve, a lateral boss made integral with the body, a rod extending axially through the boss so as to extend into the external recess of the bushing and bear against said bushing, a tube screw-threaded upon the rod and within the boss for holding said rod in a fixed position, whereby the rod may be held in engagement with the bushing to prevent movement thereof so as to limit outward movement of the sleeve and permit inward movement thereof, and a set screw extending radially through the body into said bushing external recess to limit outward movement of the bushing upon removal of said rod.

2. A gage including, a cylindrical body having an axial socket, a cylindrical bushing slidably mounted in the socket and being externally recessed intermediate its ends, means carried by the body and engaging within the bushing recess for limiting outward displacement of said bushing, a boss projecting laterally from said body, a handle slidable through the boss and having its inner end engaging within the bushing recess, means for holding the handle in a fixed position so as to maintain the bushing in adjusted positions, said bushing having an internal shoulder adjacent its inner end, a tubular sleeve telescoping within the bushing and having an external flange at its inner end for engaging the inner end of said bushing, a button screw-threaded in the outer end of the sleeve, a spring confined within said socket internally of said sleeve for urging the same outwardly, the sleeve having an external shoulder adjacent its outer end, and a spring confined between the shoulders of the bushing and sleeve for maintaining the inner end of said bushing in engagement with the external flange of said sleeve.

3. A gage including, a body having a socket, an outer telescoping element slidably mounted within the socket, means carried by the body for engaging the outer element and holding the same immovably fixed relative to said body in various positions of displacement within said socket, an inner telescoping element slidably disposed within said outer element, coacting means formed on the elements for limiting outward relative movement of the inner element with respect to the outer element, and resilient means within the socket for urging said elements outwardly.

4. A gage including a body having a socket, an outer telescoping element slidably mounted within the socket, means on the body coacting with said outer element to limit outward movement of said outer element relative to said body, an inner telescoping member slidably disposed within said outer element, resilient means acting between said inner and outer elements to urge said elements into telescoped position relative to each other, coacting means on said elements for limiting their relative motion into telescoped position, means carried by said body for engaging said outer element and holding the same fixed in various positions of displacement within said socket and resilient means within said socket for urging said elements outwardly relative to said socket.

CHARLES E. WATSON.

REFERENCES CITED

The following references are of record in the file of this patent:

UNITED STATES PATENTS

| Number | Name | Date |
| --- | --- | --- |
| 1,431,615 | Wittner | Oct. 10, 1922 |
| 2,326,410 | Swinney | Aug. 10, 1943 |
| 2,352,313 | Fernald | June 27, 1944 |